United States Patent [19]

Nishimoto

[11] Patent Number: 5,408,569
[45] Date of Patent: Apr. 18, 1995

[54] OPTICAL CHANNEL WAVEGUIDE HAVING A HIGH GERMANIA CLADDING CONTENT

[75] Inventor: Hiroshi Nishimoto, Tokyo, Japan
[73] Assignee: NEC Corporation, Japan
[21] Appl. No.: 215,329
[22] Filed: Mar. 21, 1994

[30] Foreign Application Priority Data

Mar. 26, 1993 [JP] Japan .................. 5-067260

[51] Int. Cl.⁶ .............................................. G02B 6/00
[52] U.S. Cl. ..................................... 385/132; 385/144
[58] Field of Search ............... 385/129, 130, 132, 141, 385/142, 144; 501/37, 54, 55, 63, 65; C03C 13/04

[56] References Cited

U.S. PATENT DOCUMENTS

| | | | |
|---|---|---|---|
| 4,425,146 | 1/1984 | Izawa et al. | 65/18.2 |
| 4,478,489 | 10/1984 | Blankenship et al. | 385/123 |
| 4,525,026 | 6/1985 | Elion | 385/141 |
| 4,946,239 | 8/1990 | Garmon | 385/43 |
| 5,261,022 | 11/1993 | Sun et al. | 385/130 |

FOREIGN PATENT DOCUMENTS

| | | | |
|---|---|---|---|
| 0476688A3 | 3/1992 | European Pat. Off. | G02B 6/12 |
| 157836 | 8/1982 | Germany | G02B 5/16 |
| WO92/00189 | 1/1992 | WIPO | B32B 9/00 |

OTHER PUBLICATIONS

"Scattering Property of Fluorine-doped Silica Glasses", K. Shiraki et al., 12 Aug. 1992, vol. 28, No. 17, Electronic Letters, pp. 1565–1566.

"Polarization Dependence and Temperature Characteristics of High-Silica Glass Waveguide Type Multi-Demultiplexer", H. Uetsuka et al., 1989 (no month available), pp. 4–296, Cable Research Labs Hitachi Cable Ltd.

"Guided-Wave Optical GAte Matrix Switch", Jan. 1988, A. Himeno et al., vol. 6, No. 1, Journal of Lightwave Technology, pp. 30–35.

"Optical Directional Coupler Using Deposited Silica Waveguide (DS Guide)", Jun. 1981, Y. Murakami et al. vol. QE-17, No. 6, IEEE J. of Quantum Electronics, pp. 982–987.

"Recent Advances in Integrated Optics on Silicon", Jun. 27–29, 1990, Charles H. Henry, EFOC/LAN 90, Munich, Germany.

"Very Low-Loss GeO₂-Doped Silica Waveguide Fabricated by Flame Hydrolysis Deposition Method", Electronics Letters, Mar. 1990, T. Kominato et al., vol. 26, No. 5, pp. 327–329.

"Vertically Integrated High-Silica Channel Waveguides on Si", G. Barbarossa, et al., Electronic Letters, Feb. 27, 1992, vol. 28, No. 5, pp. 437–438.

"Silica Waveguides on Silicon and Their Application to Integrated-Optic Components", Optical and Quantum Electronics, 1990 (no month available), M. Kawachi, vol. 22, pp. 391–416.

*Primary Examiner*—Frank Gonzalez
*Attorney, Agent, or Firm*—Laff, Whitesel, Conte & Saret, Ltd.

[57] ABSTRACT

An optical waveguide having a small propagation loss and formed on an Si substrate having a large diameter has a lower cladding layer, a core and an upper cladding layer surrounding the core together with the lower cladding layer, each of the lower cladding layer, core and upper cladding layer being composed of a high-silica material. The upper cladding layer or each of the upper and lower cladding layers comprises three kind of dopants including germanium oxide ($GeO_2$), phosphorus oxide ($P_2O_5$) and boron oxide ($B_2O_3$). Preferable amount of content of $GeO_2$ in the upper cladding layer is more than 5 mole percent. The optical waveguide is suitable for a hybrid optical device including a functional device such as a semiconductor laser provided with metal patterns for electrodes and interconnections. The metal pattern can be formed before a thermal treatment of the upper cladding layer without causing a deficiency in the metal pattern during the thermal treatment.

7 Claims, 2 Drawing Sheets

OPTICAL CHANNEL WAVEGUIDE HAVING A HIGH GERMANIA CLADDING CONTENT

BACKGROUND OF THE INVENTION (a) Field of the Invention

The present invention relates to an optical waveguide composed of a high-silica material.

(b) Description of the Related Art

In these days, advanced multi-functional optical systems are demanded with the increase of the capacity of the optical communication system. There are also a demand for lowering costs of optical fiber networks. Optical waveguides are a requisite for miniaturization, higher integration and low cost production of optical devices, hence various studies have been carried out on hybrid functional devices in which a semiconductor laser, a semiconductor photo detector etc. are mounted on a substrate together with optical waveguides, as well as on devices composed of optical waveguides only, such as an array of couplers, switches, filters and modulators. A specific structure of a hybrid optical device has been proposed, for example, in a literature presented by Henry et al., "Lightwave Technology", IEEE, pp. 1530–1539, 1989.

An optical waveguide composed of a high-silica material (or silica-based material) and formed on an Si substrate generally comprises three layers including a lower cladding layer, a core, and an upper cladding layer. In order to obtain an optical waveguide having a propagation loss sufficiently small in a practical optical communication system, each cladding layer should have a thickness more than about 10 $\mu$m. The core also should have a thickness more than about 5 $\mu$m in an optical device to obtain an efficient coupling with an optical fiber in the wave band for the optical communication system. Accordingly, at least about 25 $\mu$m is required for the total thickness of the three layers for obtaining an optical waveguide having a propagation loss sufficiently small in the practical optical communication system.

FIG. 1 shows a cross section of a conventional optical waveguide formed on an Si substrate 1 by a flame hydrolysis deposition using a chloride gas or CVD method using a silane gas or chloride gas for depositing a high-silica material. In flame hydrolysis deposition, undoped silica is used for a cladding 7, and a high-silica material is used for a core 8 in which a single dopant of germanium oxide ($GeO_2$) or titanium oxide ($TiO_2$) is introduced, or in which both phosphorus oxide ($P_2O_5$) and boron oxide ($B_2O_3$) are introduced. In case of flame hydrolysis deposition, silica is made transparent by a thermal treatment at a temperature about 1500° C. after silica powder has been deposited on the substrate 1. In this thermal treatment, however, cracks are likely to be generated in the high-silica layer due to the thermal strains, which makes it difficult to apply the flame hydrolysis deposition process to a large Si substrate of, for example, 6 inches in diameter. Furthermore, in an optical networks including a semiconductor laser etc. mounted on the common Si substrate together with an optical waveguide, it should be avoided to form metal layers such as electrodes or interconnections for the semiconductor laser on the Si substrate before the thermal treatment of the cladding, in view of the melting point of the metal pattern.

On the other hand, as to the CVD method, a silica material doped with a single dopant $P_2O_5$ or $GeO_2$ is widely used in the CVD process. In this process, a thermal treatment at about 1000° C. is conducted for allowing the high-silica material to reflow at the boundary between the core 8 and the cladding 7 in order to improve the contact between the core 8 and the cladding 7 and to densify the layers thereby obtaining an optical waveguide having a small propagation loss. As a result, the thermal strain is as large in the CVD method as in the flame hydrolysis deposition, so that cracks are likely to be generated in the silica layer, which makes it difficult to apply the CVD method to a large Si substrate of, for example, 6 inches in diameter.

It is known that the reflow point of a silica material goes down to a temperature ranging from 850° to 900° C. when doped with $P_2O_5$ or $B_2O_3$ during a CVD process. Since the thermal strain would be drastically reduced if the temperature range of the thermal treatment could be further reduced, an Si substrate having a larger diameter could be used in the production of waveguides to improve the propagation loss thereof. Furthermore, with a hybrid device including a semiconductor laser mounted on the Si substrate, such a temperature range would enable the metal layers to be formed on the Si substrate before the thermal treatment of the cladding so that mass production of hybrid optical devices and reduction of production cost could be realized.

SUMMARY OF THE INVENTION

In view of foregoing, an object of the present invention is to provide an optical waveguide which can be formed at a relatively low temperature during a thermal treatment of a cladding to improve a propagation loss and to adopt a substrate having a larger diameter so that the substrate is provided with metal patterns for a semiconductor laser before the thermal treatment of the wave-guide, substantially without deficiency in the metal patterns.

According to the present invention, there is provided an optical waveguide comprising a substrate, a core overlying the substrate, and a cladding formed on a main surface of the substrate for surrounding the core at the upper surface, side surfaces and lower surface of the core. Each of the core and cladding is composed of a high-silica material and the cladding is doped with three kinds of dopants including germanium oxide ($GeO_2$), phosphorus oxide ($P_2O_5$) and boron oxide ($B_2O_3$) at least in a portion disposed adjacent to the upper surface and side surfaces of the core.

The cladding may includes a lower cladding layer underlying the core and an upper cladding layer overlying the core and surrounding the core together with the lower cladding.

With the optical waveguide according to the present invention, since at least a portion of the cladding surrounding the core is composed of a high-silica material doped with three kinds of dopants including germanium oxide ($GeO_2$), phosphorus oxide ($P_2O_5$) and boron oxide ($B_2O_3$), reflow point of the portion of the cladding goes down to, for example, a temperature as low as about 700° to 800° C., which allows an optical waveguide having a low propagation loss to be formed on the substrate having a larger diameter owing to the reduction of thermal strain, and which allows to form on the substrate metal patterns for a semiconductor laser etc., substantially without causing any deficiency in the metal pattern during the thermal treatment of the upper cladding layer.

BRIEF DESCRIPTION OF THE DRAWINGS

The above and further objects as well as features and advantages of the present invention will be more apparent from the following description with reference to the drawings in which.

DESCRIPTION OF THE PREFERRED EMBODIMENT

Now, preferred embodiments of the present invention will be described with reference to the drawings.

Figure 1:
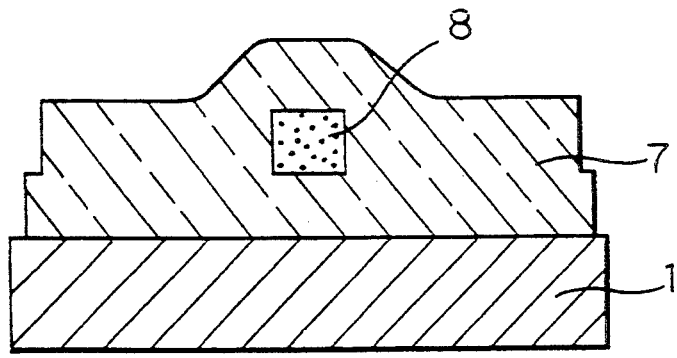
FIG. 1 is a cross-sectional view of a conventional optical waveguide.
Figure 2:
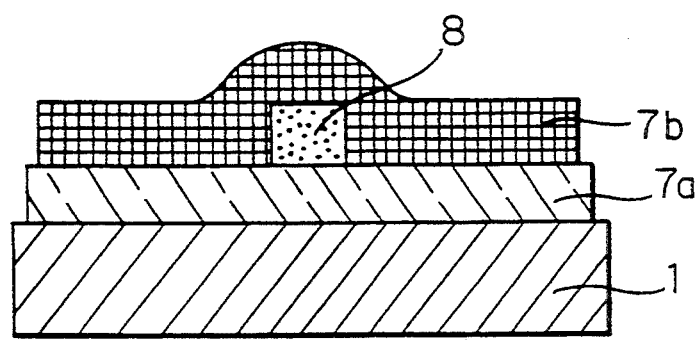
FIG. 2 is a cross-sectional view of an optical waveguide according to a first embodiment of the present invention.

Referring to FIG. 2, there is shown a schematic structure of an optical waveguide according to the first embodiment of the present invention. In FIG. 2, a core 8 is made of a high-silica material, $SiO_2$, in which a single dopant of germanium oxide ($GeO_2$) is introduced ($SiO_2$ doped with $GeO_2$ will be referred to as GeSG hereinafter), and a lower cladding layer 7a is made of undoped $SiO_2$ (referred to as NSG hereinafter). An upper cladding layer 7b is made of $SiO_2$ in which three kinds of dopants including germanium oxide ($GeO_2$), phosphorus oxide ($P_2O_5$) and boron oxide ($B_2O_3$) are introduced according to the principle of the present invention (referred to as GeBPSG hereinafter).

GeBPSG which forms the upper cladding layer 7b can be annealed to reflow by a thermal treatment at a temperature of about 750° C. conducted after the deposition thereof. The reflow point of the upper cladding layer 7b can be lowered drastically by 100° C. or more as compared to a conventional $SiO_2$ layer in which both $P_2O_5$ and $B_2O_3$ are doped (hereinafter referred to as PSG) and which has a reflow point of about 1000° C. The thermal treatment of the upper cladding layer 7b at such a low temperature allows the use of Si substrates having a large diameter substantially without a deficiency in the production of optical waveguides having a small propagation loss. It also enables various metal patterns such as electrodes and interconnections for a semiconductor laser etc. to be formed before the thermal treatment of the cladding layer, the semiconductor laser etc. being formed on the common Si substrate in a hybrid device.

Accordingly, mass production of a hybrid optical device and reduction of the production cost thereof can be realized. It will be readily understood that the lower cladding layer 7a can be made of any $SiO_2$ material with a refractive index smaller than that of the core 8. It will be also understood that the core 8 can be made of any $SiO_2$ material having a refractive index larger than those of the lower cladding layer 7a and the upper cladding layer 7b, and may be made of PSG, BPSG, GeBPSG, GeSG or $SiO_2$ doped with both $GeO_2$ and $P_2O_5$ (referred to as GePSG hereinafter).

Each of the dopants $P_2O_5$ and $B_2O_3$ may be introduced into the upper cladding layer 7b in an amount from a trace amount to the upper limit amount of the doping. Preferable doping amount of content of each of the dopants $P_2O_5$ and $B_2O_3$ is from about 3 to 10 mole percent. The dopant Ge is preferably introduced into the upper cladding layer 7b in an amount of content higher than about 5 mole percent, more preferably, higher than about 15 mole percent. $GeO_2$ can be introduced into the upper cladding layer 7b in an amount of content about 50 mole percent.

Figure 3:
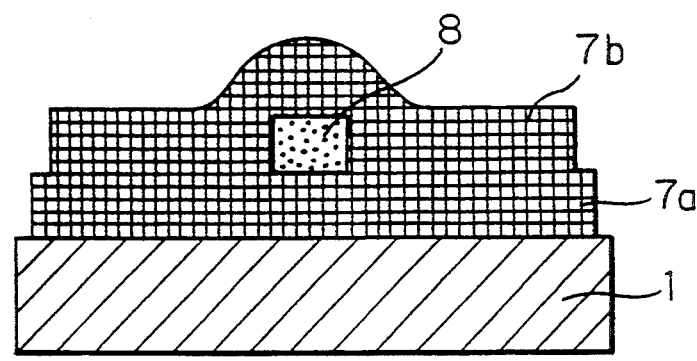
FIG. 3 is a cross-sectional view of an optical waveguide according to a second embodiment of the present invention.

Referring to FIG. 3, there is shown an optical waveguide according to the second embodiment of the present invention. In this embodiment, the core 8 is made of GePSG, and both of the lower cladding layer 7a and the upper cladding layer 7b are made of GeBPSG. Although the advantages obtained in this embodiment are basically the same as those obtained in the embodiment shown in FIG. 2, the second embodiment provides an optical waveguide having a further reduced propagation loss, since the lower cladding layer 7a is also subjected to reflow at the temperature of about 750° C. The surface of the lower cladding layer 7a is smoothed and the reflow thereof is effected after the upper cladding layer 7b has been deposited, so that almost every gap can be eliminated at the boundary between the the core 8 and the cladding layers 7a and 7b surrounding the core 8. It will be understood that the core 8 can be made of any $SiO_2$ material with a refractive index larger than that of the lower cladding layer 7a and the upper cladding layer 7b, and may be made of NSG, PSG, BPSG, GeBPSG, GeSG or GePSG. The amounts of content of the dopants introduced in the cladding layers 7a and 7b is similar to those in the cladding layer 7b of the first embodiment.

Figure 4:
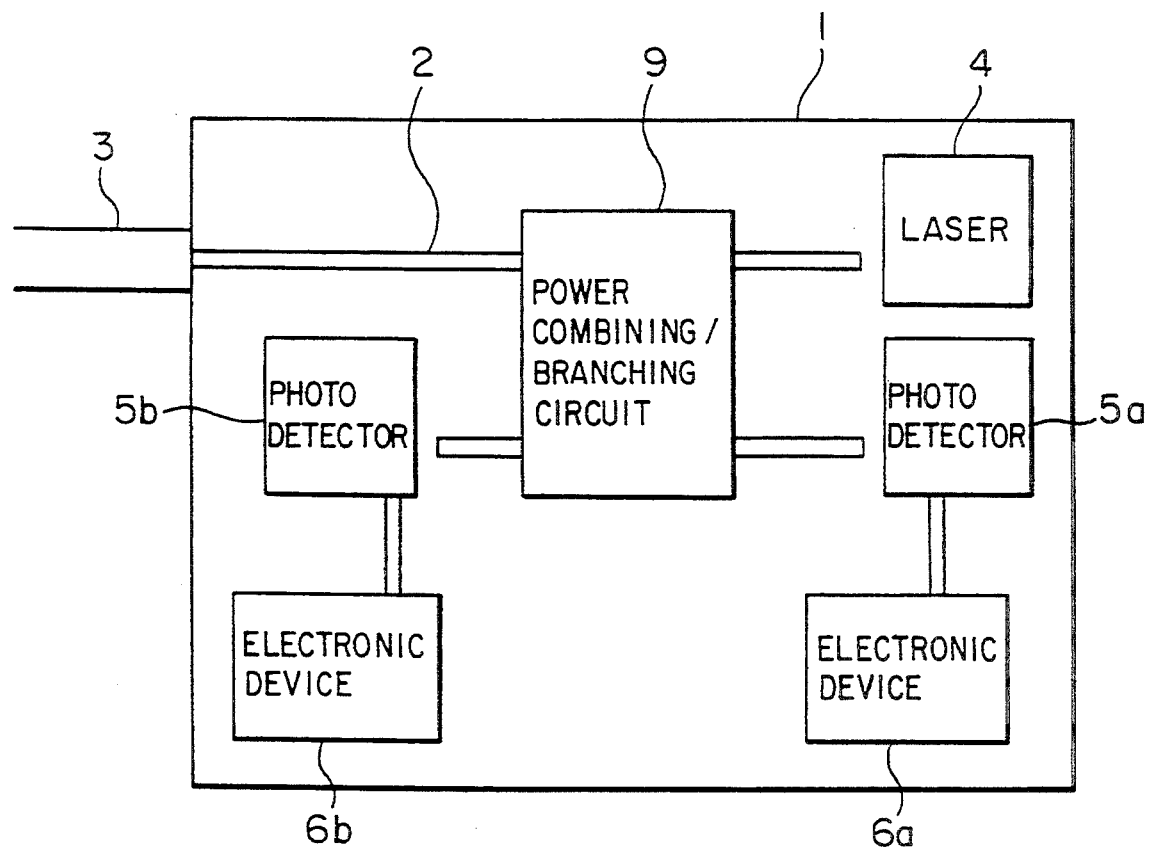
FIG. 4 is a schematic plan view of a hybrid functional optical device according to a third embodiment of the present invention.

FIG. 4 shows a schematic plan view of an optical coupling circuit constituting a hybrid optical device according to a third embodiment of the present invention. The device structure of FIG. 4 is the same as proposed in the literature described before. In the optical coupling circuit, an optical waveguide 2 including an optical power combining/branching circuit or optical wavelength mixing/splitting circuit 9 is formed on a substrate 1, and the optical waveguide 2 is optically coupled directly with an optical fiber 3, a semiconductor laser 4, and a semiconductor photo detector 5a formed on the common substrate 1.

Another semiconductor photo detector 5b for monitoring the optical output of the semiconductor laser 4 is also integrally formed on the common substrate 1 and is optically coupled to the optical waveguide 2. However, the semiconductor photo detector 5b for monitoring the optical output of the semiconductor laser 4 may be omitted in a device which operates as a transceiver for bi-directional optical communication. Electronic devices 6a and 6b of receiving circuits for the semiconductor photo detectors 5a and 5b are also integrally formed on the common substrate 1. However, the electronic devices 6a and 6b may be omitted in a device which operates as a transceiver for bi-directional optical communication.

When the optical transceiver of FIG. 4 is fabricated using the optical waveguide of FIG. 2 or 3 according to the present invention, not only miniaturization but also reductions of cost and propagation loss can be attained in the device. In a conventional hybrid optical devices, a high-silica, ferroelectric-based, organic-based or semiconductor material is usually used as the material for forming optical waveguides. When a high-silica material of the same type as that of optical fibers connected to the waveguide, among those materials, is used in an optical waveguide, as is the case of the present embodiment, the propagation loss of guided light wave can be minimized, and therefore an optical communication system having a small propagation loss can be readily realized.

Although the present invention is described with reference to the preferred embodiments thereof, the present invention is not limited to such embodiments and various modifications or alterations can be easily made based on the above embodiments without departing from the scope of the present invention.

What is claimed is:

1. An optical waveguide comprising a substrate, a lower cladding layer composed of a first high-silica material and formed on said substrate, a core composed of a second high-silica material and formed on said lower cladding layer, an upper cladding layer composed of a third high-silica material and formed on said core and said lower cladding layer for surrounding said core together with said lower cladding layer, said third high-silica material including at least three kinds of dopants including germanium oxide ($GeO_2$), phosphorus oxide ($P_2O_5$), and boron oxide ($B_2O_3$), said third high-silica material including $GeO_2$ in an amount of content which is higher than about 5 mole percent.

2. An optical waveguide as defined in claim 1 wherein said third high-silica material includes $GeO_2$ in an amount of content higher than about 15 mole percent.

3. An optical waveguide as defined in claim 1 wherein said third high-silica material includes each of $P_2O_5$ and $B_2O_3$ in an amount of content which is between about 3 mole percent and about 10 mole percent.

4. An optical waveguide comprising a substrate, a lower cladding layer composed of a first high-silica material and formed on said substrate, a core composed of a second high-silica material and formed on said lower cladding layer, an upper cladding layer composed of a third high-silica material and formed on said core and on said lower cladding layer for surrounding said core, said third high-silica material including at least three kinds of dopants including germanium oxide ($GeO_2$), phosphorus oxide ($P_2O_5$) and boron oxide ($B_2O_3$), said first high-silica material including at least three kinds of dopants including germanium oxide ($GeO_2$), phosphorus oxide ($P_2O_5$) and boron oxide ($B_2O_3$), said first high-silica material including $GeO_2$ in an amount of content higher than about 5 mole percent.

5. An optical waveguide as defined in claim 4 wherein said first high-silica material includes $GeO_2$ in an amount of content higher than about 15 mole percent.

6. An optical waveguide as defined in claim 4 wherein said first high-silica material includes $P_2O_5$ and $B_2O_3$, both in an amount of content between about 3 mole percent and about 10 mole percent, respectively.

7. An optical waveguide comprising a substrate; a core and a cladding layer formed on a main surface of said substrate; said cladding layer surrounding the upper surface, two side surfaces, and lower surface of said core; each of said core and cladding being composed of a high silica material, said cladding being doped with at least three kinds of dopants including germanium oxide ($GeO_2$), phosphorus oxide ($P_2O_5$) and boron oxide ($B_2O_3$) at least in a portion disposed adjacent to the upper surface and side surfaces of said core, said cladding layer including $GeO_2$ in an amount of content which is higher than about 5 mole percent.

* * * * *